(12) United States Patent
Schmitt et al.

(10) Patent No.: US 7,278,835 B2
(45) Date of Patent: Oct. 9, 2007

(54) PISTON PUMP

(75) Inventors: Edgar Schmitt, Vaihingen (DE); Norbert Alaze, Markgroeningen (DE); Ernst-Dieter Schaefer, Brackenheim (DE); Marcus Egle, Marbach (DE); Jochen Braun, Heimsheim (DE); Ursula Eckstein, Schwieberdingen (DE); Peter Zimmermann, Ilsfeld (DE); Christian Debusmann, Kornwestheim (DE); Manfred Dreyer, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 10/471,261

(22) PCT Filed: Mar. 13, 2002

(86) PCT No.: PCT/DE02/00891

§ 371 (c)(1),
(2), (4) Date: Apr. 14, 2004

(87) PCT Pub. No.: WO02/072398

PCT Pub. Date: Sep. 19, 2002

(65) Prior Publication Data

US 2004/0166004 A1    Aug. 26, 2004

(30) Foreign Application Priority Data

Mar. 14, 2001 (DE) ................. 101 12 618

(51) Int. Cl.
F04B 19/00 (2006.01)
F04B 11/00 (2006.01)
F16L 55/04 (2006.01)

(52) U.S. Cl. .................. 417/470; 417/540; 138/26
(58) Field of Classification Search ............... 417/540, 417/470; 138/26, 30
See application file for complete search history.

(56) References Cited

U.S. PATENT DOCUMENTS

| 4,363,607 A | | 12/1982 | Eichele et al. | |
| 5,213,482 A | * | 5/1993 | Reinartz et al. | ............ 417/273 |
| 5,797,430 A | | 8/1998 | Becke et al. | |

FOREIGN PATENT DOCUMENTS

| DE | 40 27 794 A1 | | 3/1992 |
| DE | 43 11 263 A1 | | 10/1994 |
| DE | 197 32 771 A1 | | 2/1999 |
| DE | 10061188 | * | 12/2000 |
| JP | 11-303731 | | 2/1999 |
| JP | 2001-1885 | | 9/2001 |
| WO | WO 90/07060 | | 6/1990 |
| WO | WO 90/11212 | | 10/1990 |
| WO | WO 01/00990 | | 1/2001 |
| WO | WO02081918 A1 | * | 10/2002 |

* cited by examiner

Primary Examiner—Charles G Freay
(74) Attorney, Agent, or Firm—Ronald E. Greigg

(57) ABSTRACT

A piston pump for brake systems employs a pulsation-smoothing device that functions especially well in the region of the outlet valve. As a result, substantially less noise occurs, and the durability of the piston pump is substantially better. The piston pump is used essentially in traction-controlled motor vehicle brake systems.

6 Claims, 10 Drawing Sheets

PISTON PUMP

CROSS-REFERENCE TO RELATED APPLICATIONS

Figure 1:
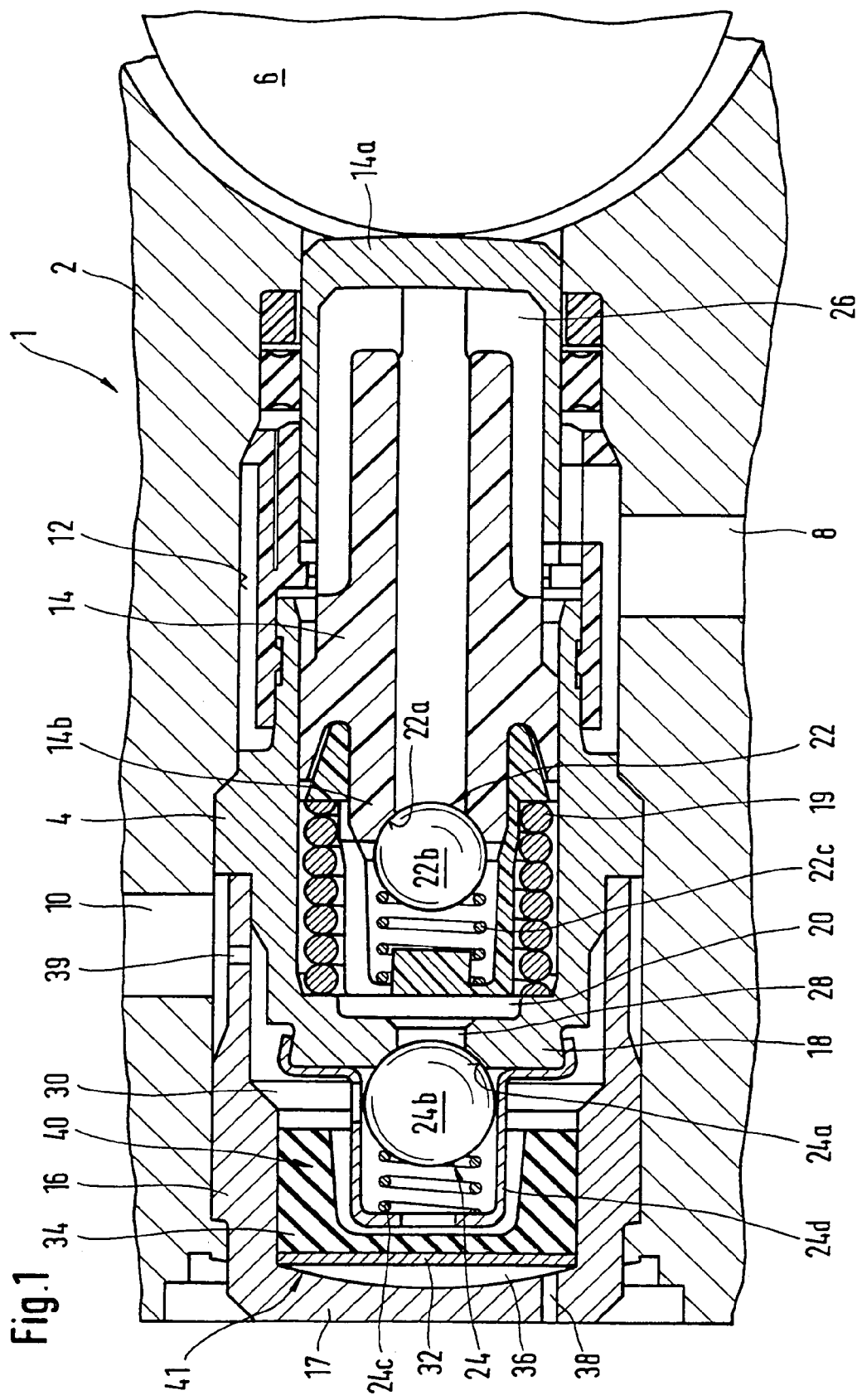

This application is a 35 USC 371 application of PCT/DE 02/00891 filed on Mar. 13, 2002.

BACKGROUND OF THE INVENTION

1. Field of the Invention

The invention relates to a piston pump intended particularly for a hydraulic traction-controlled vehicle brake system.

2. Description of the Prior Art

German Published, Nonexamined Patent Application DE 42 26 646 A1 shows a hydraulic vehicle brake system with a pump, in which a pressure damper is provided downstream of an outlet check valve. For the pressure damper provided in the pressure line to have an adequate effect, the pressure damper must be made suitably large. Because of the pressure damper, the known vehicle brake system is relatively large as well, and increased production cost is necessary. Upon actuation of the brake pedal, some of the pressure medium positively displaced via the driver's foot is forced into the pressure damper. Because the pressure damper must be relatively large for an adequate effect, upon actuation of the brake pedal a relatively large quantity of pressure medium has to be positively displaced, which must be taken into account by suitable dimensioning of the components involved in this process. As a result, the known brake system is rather large in size.

SUMMARY AND ADVANTAGES OF THE INVENTION

The piston pump of the invention has the advantage that the pulsation-smoothing device quite effectively overcomes the pressure pulsations and pressure waves that otherwise occur in a piston pump. Because of the high effectiveness of the pulsation-smoothing device, this device can be made rather small while an adequate effect is nevertheless attained. Since the pulsation-smoothing device can be made rather small, the advantage is attained that the overall piston pump is fairly small. This has the advantage of a vehicle brake system that is small overall. Because the pulsation-smoothing device is small because of its good effectiveness, and in particular the storage volume can be kept rather small, the advantage is attained that upon an actuation of the brake pedal, at most an insignificant proportion of the pressure medium put under pressure by the driver's foot is taken up by the pulsation-smoothing device, so that there is practically no negative effect from the pulsation-smoothing device on the mode of operation of the vehicle brake system during an actuation of the brake pedal.

Because the pulsation-smoothing device is rather small, and especially because the storage volume for the pulsation-smoothing device can be kept fairly small, it is advantageously also unnecessary to provide a check valve downstream of the pulsation-smoothing device. Because this check valve is not necessary, the advantage is attained that the production cost and structural size of the vehicle brake system of the invention can be kept small; there is also the advantage that the unnecessary additional check valve cannot become defective.

Because of the good damping of pressure fluctuations by the pulsation-smoothing device, the advantage is attained that substantially less noise is created, and the durability of the piston pump is substantially better.

Drawing BRIEF DESCRIPTION OF THE DRAWINGS

Other features and advantages of the invention will become apparent from the description contained herein below, taken in conjunction with the drawings, in which:

FIG. 1 is a fragmentary longitudinal sectional view of a hydraulic block of a traction-controlled vehicle which brake system in the region of the piston pump of the system; and FIGS. 2-10 are views similar to FIG. 1 of a plurality of different, preferably selected and especially advantageous exemplary embodiments.

DESCRIPTION OF THE PREFERRED EMBODIMENTS

The pump assembly of the invention is intended in particular as a pump in a brake system of a vehicle and is used to control the pressure in wheel brake cylinders. Depending on the type of brake system, the abbreviations ABS (for anti-lock brake system), TCS (traction control system), VDC (vehicle dynamics control) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (TCS or VDC or EHB). In a brake system with wheel slip control (ABS or TCS) and/or a brake system serving as a steering aid (VDC) and/or an electrohydraulic brake system (EHB), for instance, the pump is needed. With wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (VDC), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

FIG. 1 shows a first, especially advantageous, preferably selected exemplary embodiment, in which a piston pump 1 is built into a hydraulic block, shown in part and in section, of the vehicle brake system. A plurality of piston pumps 1 can be built into the hydraulic block. The hydraulic block forms a pump housing 2 of the piston pump 1. The piston pump 1 includes a bush 4, inserted into the pump housing 2, an eccentric element 6, an inlet connection 8, and an outflow conduit 10. The inlet connection 8 and the outflow conduit 10 extend through the hydraulic block or pump housing 2. From the outflow conduit 10, branching lines not shown lead via hydraulic valves, not shown, to a master cylinder and wheel brake cylinders, not shown. An installation chamber 12 is located in the pump housing 2. The bush 4 and a pump piston 14 are inserted into the installation chamber 12. The pump piston 14 has one end 14a toward the eccentric element 6. and one end 14b remote from the eccentric element 6. Via the eccentric element 6. the pump piston is successively driven to execute an intake stroke and a compression stroke in alternation.

The installation chamber 12 provided in the pump housing 2 is sealed off from the outside by a closure piece 16. The closure piece 16 has a bottom 17 on its face end, oriented outward. The bush 4 has a bottom 18 on its end, toward the closure piece 16. A restoring spring 19 braced on the bush bottom 18 and on the pump piston 14 keeps the end 14a of the pump piston 14 in contact with the eccentric element 6. Between the bush bottom 18 and the end 14b, remote from the eccentric element 6, of the pump piston 14, there is a compression chamber 20 that increases in size during an intake stroke and decreases in size during a compression stroke.

The piston pump 1 has an inlet valve 22. The inlet valve 22 has a valve seat 22a, a closing body 22b, and a closing spring 22c. The closing spring 22c urges the closing body 22b against the valve seat 22a provided on the pump piston 14.

The piston pump 1 has an outlet valve 24. The outlet valve 24 has a valve seat 24a, a closing body 24b, a closing spring 24c, and a retaining element 24d. The closing spring 24c urges the closing body 24b against the valve seat 24a, which is structurally connected to the housing and for instance is provided on the bush bottom 18. One end of the closing spring 24c is braced on the closing body 24b, and one end of the closing spring 24c is braced on the retaining element 24d structurally connected to the housing. The retaining element 24d is secured to the bottom 18 of the bush 4. The retaining element 24b serves not only to brace the closing spring 24c but also to guide the closing body 24b. The retaining element 24d has at least one passage of adequate size, through which the pressure medium can flow.

An inlet passage 26 leads from the inlet connection 8 to the inlet valve 22. A passage 28 leads from the compression chamber 20 through the bush bottom 18 to the outlet valve 24. The valve seat 24a surrounds the passage 28.

On the side of the closing body 24b remote from the passage 28, there is an outflow chamber 30. In other words, the outflow chamber 30 is the chamber that adjoins the valve seat 24a downstream. In the exemplary embodiment selected, the outflow chamber 30 is located between the bush bottom 18 and the bottom 17 of the closure piece 16. The closing spring 24c and the retaining element 24d are located in the outflow chamber 30.

An elastically resilient wall 32 is built in, inside the installation chamber 12. The elastically resilient wall 32 is located downstream of the valve seat 24a, in the immediate vicinity of the outlet valve 24. The outer circumference of the elastically resilient wall 32 is built in tightly and firmly inside the closure piece 16. The resilient wall 32 is acted upon by the pressure prevailing in the outflow chamber 30. On the side of the resilient wall 32 remote from the outflow chamber 30, there is a counterpart chamber 36. Inside the counterpart chamber 36, a gas is for instance tightly trapped. However, it is also possible for the counterpart chamber 36 to communicate with the atmosphere via an opening 38.

A compressible body 34 is built into the outflow chamber 30, in the immediate vicinity of the outlet valve 24. The compressible body 34 is acted upon on one side by the pressure prevailing in the outflow chamber 30, and on the other side, the compressible body 34 is predominantly braced against the resilient wall 32. The compressible body 34 covers the entire surface of the resilient wall 32. On its outer circumference, the compressible body 34 additionally serves to provide sealing between the outflow chamber 30 and the counterpart chamber 36. The volume of the compressible body 34 is dimensioned to be great enough that at low-frequency pressure fluctuations in the outflow chamber 30, the volume of the compressible body 34 varies in accordance with the pressure pulsations, so that the pressure pulsations are intercepted by the compressible body 34 and thus smoothed out. The compressible body 34 is preferably made of rubber or an elastomer material. The compressible body 34 preferably has intrinsically minimally small gas-filled voids, so that upon pressure changes, a change in volume of the compressible body 34 can take place.

The compressible body 34 comprises a material of such a kind that it has a volume that is variable as a function of pressure. A material is selected that upon varying its volume dissipates some of the energy of the pulsations by means of internal friction.

The resilient wall 32 is preferably a relatively thin, platelike disk of a springy material, preferably spring steel. The elasticity and resilience of the springy, resilient wall 32 is dimensioned such that at high-frequency pressure pulsations in the outflow chamber 30, upon a sudden pressure increase, the resilient wall 32 yields in the direction of the counterpart chamber 36, while upon a high-frequency, sudden pressure drop in the outflow chamber 30, the resilient wall 32 springs back in the direction of the outflow chamber 30. It is thus attained that high-frequency pressure pulsations are smoothed out in the immediate vicinity, just downstream of the valve seat 24a.

The outflow chamber 30 communicates with the outflow conduit 10 via a throttle 39. The throttle 39 is disposed in the vicinity of the outlet valve 24, close to the outlet valve 24. With the aid of the throttle 39, it is attained that the pressure pulsations occurring in the region of the outlet valve 24 inside the outflow chamber 30 act in concentrated form on the resilient wall 32 and on the compressible body 34. By means of the resilient wall 32 and the compressible body 34, pressure pulsations are prevented from occurring in the immediate location where the pulsations would otherwise occur, so that the pulsations cannot spread past the throttle 39 into the outflow conduit 10.

In the exemplary embodiment shown in FIG. 1, the shape of the outflow chamber 30 in cooperation with the elastically resilient wall 32, the compressible body 34, the counterpart chamber 36, and the throttle 39, forms a highly effective pulsation-smoothing device 40. The components of the pulsation-smoothing device 40 are preferably disposed in the immediate vicinity of the outlet valve 24. As a result, the hydraulic resilience of the pulsation-smoothing device 40 can be kept relatively slight. This has the advantage that despite very good pulsation smoothing, the hydraulic system in the outflow conduit 10 can be kept fairly rigid, even without using an additional check valve downstream of the pulsation-smoothing device 40.

By building the wall 32, the body 34, and the counterpart chamber 36 into the closure piece 16, the advantage is attained that a small total number of components is needed, and that the assembly of the piston pump 1 can be accomplished without additional expense. The closure piece 16 is built into the installation chamber in pressure-tight fashion, by way of a crimped connection known per se. The closure piece 16 seals off the high-pressure region of the piston pump 1 from the outside.

Figure 2:
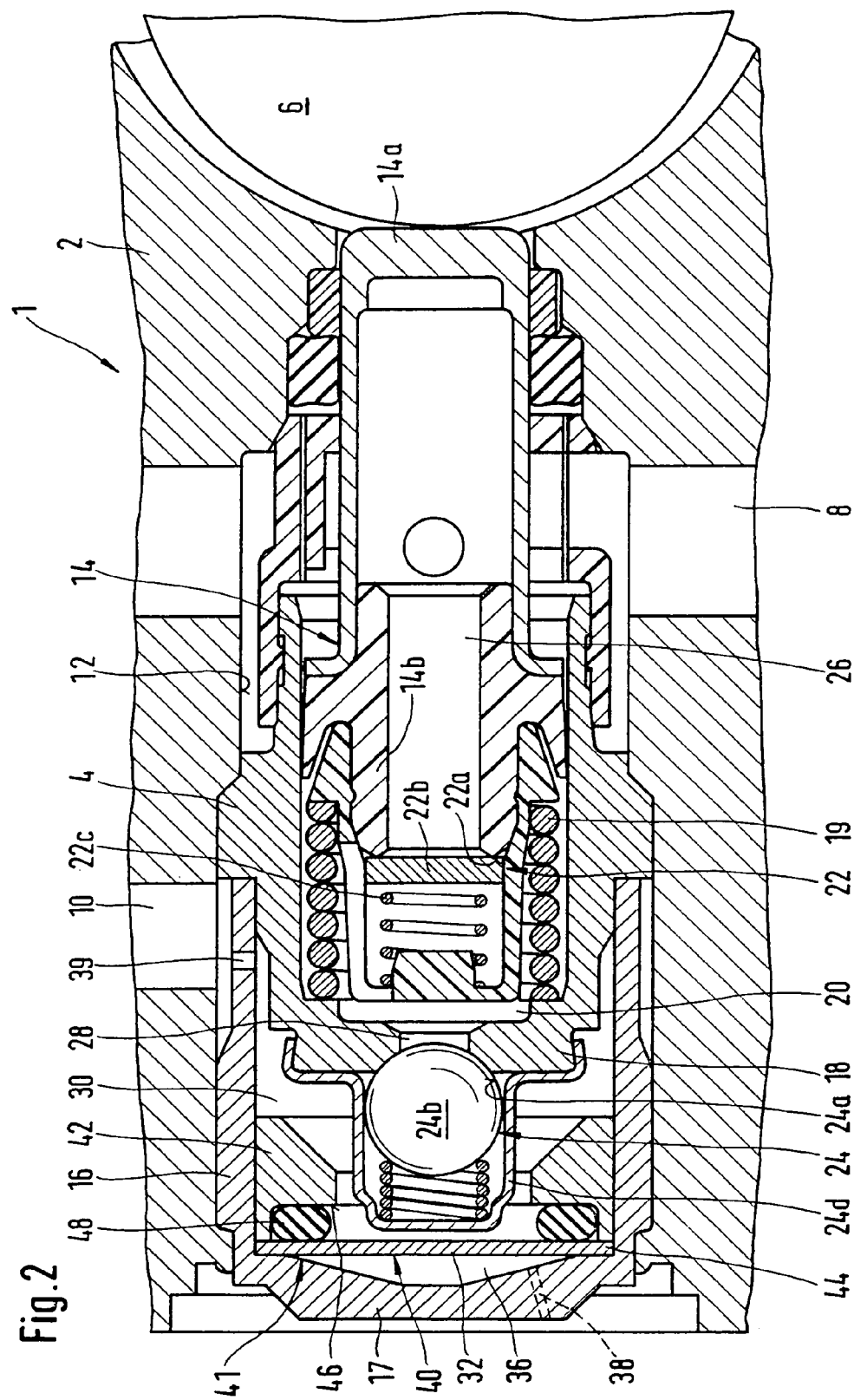

FIG. 2 shows a further, especially advantageous, preferably selected exemplary embodiment.

In all the drawings, elements that are the same or function the same are identified by the same reference numerals. Unless anything is said to the contrary or shown to the contrary in the drawing, what is said for and shown in one of the drawings applies to the others as well. Unless otherwise stated in the explanations, the details of the individual exemplary embodiments and the various drawings can be combined with one another.

In the exemplary embodiment shown in FIG. 2, a retaining element 42 is press-fitted into the closure piece 16. The retaining element 42 keeps the resilient wall 32 in contact with a shoulder 44 provided on the closure piece 16. Between an annular end face 46 of the retaining element 42 and the resilient wall 32, a compressible annular body 48 is installed. The compressible annular body 48 provides sealing between the outflow chamber 30 and the counterpart chamber 36. For the annular body 48, the same material as for the compressible body 34 can be used.

At low-frequency pressure pulsations in the outflow chamber 30, the compressible annular body 48 is compressed radially outward upon a pressure increase, while at low-frequency pressure drops, the annular body 48 springs back radially inward. As a result, low-frequency pressure pulsations are eliminated, or at least damped considerably, directly in the outflow chamber 30.

In the exemplary embodiment shown in FIG. 2, the shape of the outflow chamber 30, in cooperation with the wall 32 that is elastically resilient as a function of pressure, the compressible annular body 48, the counterpart chamber 36, and the throttle 39, forms the highly effective pulsation-smoothing device 40. The components of the pulsation-smoothing device 40 are preferably disposed in the immediate vicinity of the outlet valve 24.

Figure 3:
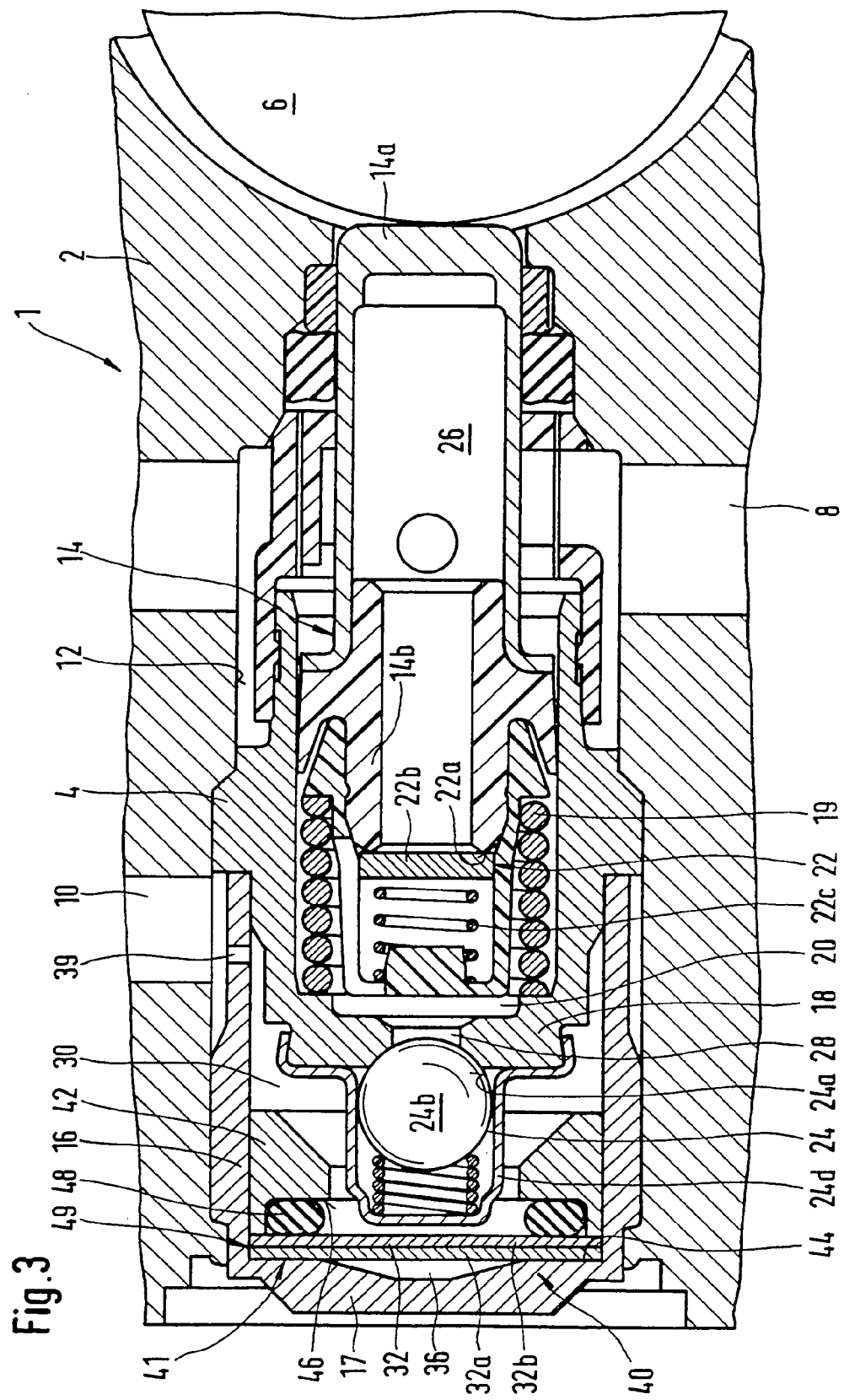

FIG. 3 shows a further, especially advantageous, preferably selected exemplary embodiment.

The resilient wall 32 can for instance, as shown in FIG. 2, comprise a single spring-elastic plate. However, as shown in FIG. 3, the resilient wall 32 can also be assembled from a first spring-elastic plate 32a and a second spring-elastic plate 32b. It is also possible, however, to modify the exemplary embodiment in such a way that the resilient wall 32 is put together from three plates resting flatly against one another and preferably compressed somewhat, or even four or more such plates. What in this case are at least two spring-elastic plates 32a, 32b are put together in such a way that between them, a friction device 49 is created.

Upon high-frequency pressure pulsations in the outflow chamber 30, the resilient wall 32 yields in the direction of the counterpart chamber 36, or back in the direction of the outflow chamber 30. The result is flexing of the resilient wall 32. Because of this flexing, the spring-elastic plates 32a and 32b shift relative to one another. This creates a relative motion between the plates 32a, 32b, and because of the friction, damping occurs. The result is especially effective damping of the high-frequency pressure pulsations in the outflow chamber 30.

In the exemplary embodiment shown in FIG. 3, the shape of the outflow chamber 30, in cooperation with the elastically resilient wall 32, the throttle 39, the annular body 48, the counterpart chamber 36, and the friction device 49, forms the highly effective pulsation-smoothing device 40. The components of the pulsation-smoothing device 40 are preferably disposed in the immediate vicinity of the outlet valve 24.

It is noted that the friction device 49 can be installed in the exemplary embodiments shown in the other drawings as well. Particularly in FIGS. 1, 2, 4, 6 and 7, the elastically resilient wall 32 provided for the sake of forming the friction device 49 can also be put together from a plurality of plates contacting one another and rubbing against one another.

Figure 4:
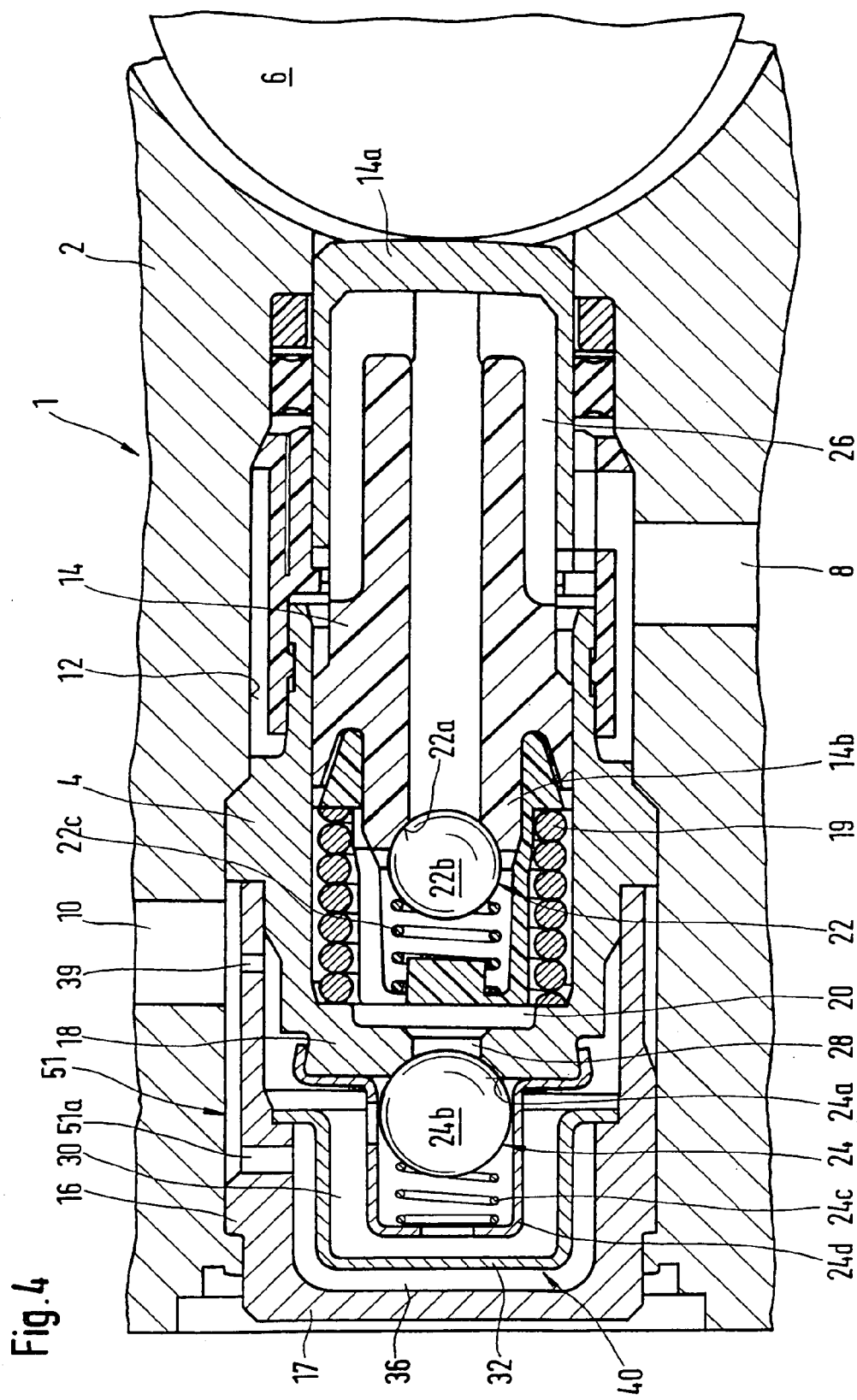

FIG. 4 shows a longitudinal section through a further, especially advantageous, selected exemplary embodiment.

In the exemplary embodiment shown in FIG. 4, the elastically resilient wall 32 is approximately in the form of a top hat. The outer rim of the elastically resilient wall 32 is press-fitted into the closure piece 16. The counterpart chamber 36 communicates with the outflow conduit 10 via a connection 51. The cross section of the connection 51 is dimensioned such that the flow of pressure medium is throttled somewhat in this connection 51. The connection 51 has a connecting throttle 51a. However, the throttling action of the throttle 39 is preferably substantially stronger than the throttling action of the connecting throttle 51a.

Upon pressure pulsations in the outflow chamber 30, an elastic deformation of the wall 32 occurs. In the elastic deformation of the wall 32, some of the energy upon pressure pulsations is intercepted by the resilient wall 32. As a result, the pressure pulsations are attenuated substantially and cannot spread, or can spread only with substantial attenuation, via the throttle 39 into the outflow conduit 10. The substantially attenuated pressure pulsations reaching the outflow conduit 10 are operative through the connection 51 as far as the counterpart chamber 36. Because of the travel distance and because of the throttle 39 as well as the connecting throttle 51a that may be provided in the connection 51, the pressure pulsations reach the counterpart chamber 36 with a phase offset relative to the pressure pulsations in the outflow chamber 30. This reinforces the elastic flexing of the resilient wall 32, so that because of the pressure pulsations in phase opposition in the counterpart chamber 36, an especially effective breakdown of pressure pulsations in the outflow chamber 30 results. As a result, very uniform flow of pressure medium is obtained in the outflow conduit 10.

In the exemplary embodiment shown in FIG. 4, the shape of the outflow chamber 30, along with the elastically resilient wall 32, the counterpart chamber 36, the throttle 39, and the connection 51 connecting the counterpart chamber 36 with the outflow conduit 10, form the highly effective pulsation-smoothing device 40. The components of the pulsation-smoothing device 40 are preferably disposed in the immediate vicinity of the outlet valve 24.

Figure 5:
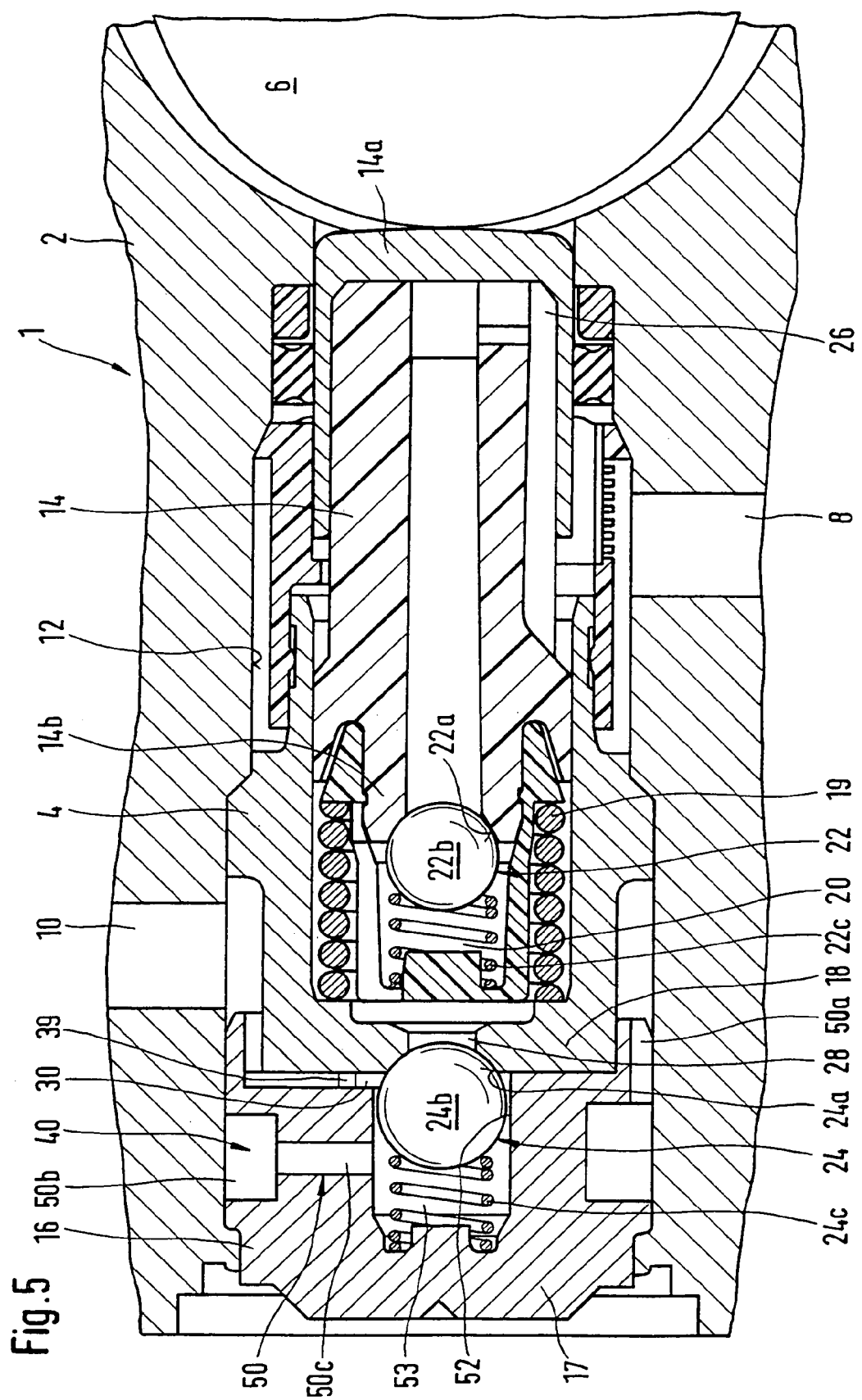

FIG. 5 shows a further selected, especially advantageous exemplary embodiment.

The outlet valve 24, on the side of the closing body 24b remote from the passage 28, has a rear valve chamber 53.

In the exemplary embodiment shown in FIG. 5, the ball-shaped closing body 24b of the outlet valve 24 is guided in the opening direction along a constriction in the closure piece 16. The constriction between the closing body 24b and the closure piece 16 is so narrow that at most an insignificant, negligibly small fluidic communication exists between the rear valve chamber 53 and the outflow chamber 30. Because the constriction disconnects the outflow chamber 30 from the rear valve chamber 53, this constriction will hereinafter be called the disconnection point 52.

A passage 50 connects the outflow conduit 10 with the rear valve chamber 53.

In this exemplary embodiment, the passage 50 is composed of one longitudinal groove 50a or a plurality of longitudinal grooves 50a, one circumferential groove 50b, and one radial hole 50c or a plurality of radial holes 50c. The circumferential groove 50b communicates with the outflow conduit 10 via the at least one longitudinal groove 50a and with the rear valve chamber 53 via the at least one radial hole 50c. If the closing body 24b vibrates, which could cause a pressure pulsation in the outflow chamber 30, pressure medium is exchanged between the rear valve chamber 53 and the outflow conduit 10. In this process, the pressure medium flows through the passage 50, which has multiple right angles. These right angles engender an advantageous resistance, which assures that in the rear valve chamber 53, pressure fluctuations oriented counter to vibration of the closing body 24b will build up, which assure effective damping of the vibration of the closing body 24b. As a result, and especially also in cooperation with the throttle 39 between the outflow conduit 10 and the outflow chamber 30, it is assured that any pressure pulsations that occur will be effectively reduced, and in particular that any pressure pulsations that occur will not reach the outflow conduit 10.

Between the outflow chamber 30 and the outflow conduit 10, the throttle 39 is preferably provided, which additionally contributes to smoothing pressure pulsations. The throttle 39 has an especially pulsation-damping effect if it is disposed fairly close to the region of the valve seat 24a.

In the exemplary embodiment shown in FIG. 5, the shape of the outflow chamber 30, in cooperation with the rear valve chamber 53, the throttle 39, and the passage 50, forms the highly effective pulsation-smoothing device 40. The components of the pulsation-smoothing device 40 are preferably disposed in the immediate vicinity of the outlet valve 24.

Figure 6:
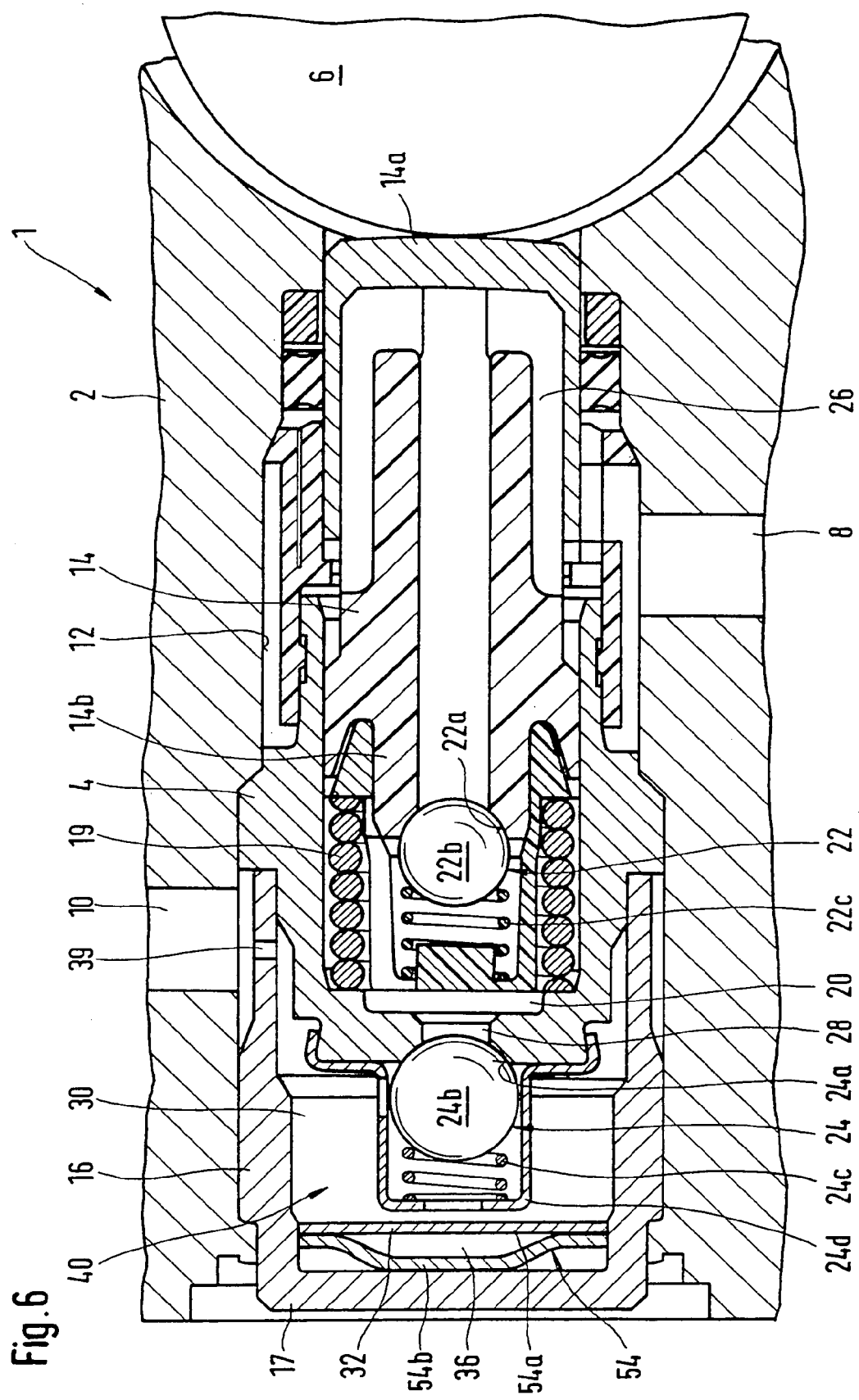

FIG. 6 shows a further especially advantageous exemplary embodiment.

In the exemplary embodiment shown in FIG. 6, a barometric cell 54 is inserted into the interior of the closure piece 16 and thus into the installation chamber 12. The barometric cell 54 preferably shown for instance comprises a first wall 54a and a second wall 54b. The two walls 54a, 54b are joined in pressure-tight fashion to one another on their circumference, preferably being welded together. As a result, in this exemplary embodiment, the counterpart chamber 36 between the two walls 54a, 54b is hermetically sealed off from the outside. In the counterpart chamber 36, there is preferably a readily compressible gas, such as air. The barometric cell 54 is inexpensive to produce and durably assures a sealed enclosure of a gas volume.

The first wall 54a, toward the outflow chamber 30, forms the elastically resilient wall 32. Because of the elastically resilient wall 32, the outflow chamber 30 enlarges somewhat upon pressure pulsations during a pressure increase, so that the pressure increase is substantially less forceful than if the elastically resilient wall 32 were not present. During a pressure drop, the elastically fastened wall 32 springs back in the direction of the outflow chamber 30, so that the pressure drop in the outflow chamber 30 is not so forceful as if the elastically resilient wall 32 were not present. The throttle 39 assures that the pressure fluctuations are essentially limited to the outflow chamber 30, where because of the elastically resilient wall 32 an effective smoothing of the pressure fluctuations occurs. As a result, it is attained that a flow with effectively smoothed pressure fluctuations is present in the outflow conduit 10.

In this exemplary embodiment as well, a friction device that additionally damps vibration can be provided, as shown in FIG. 2, for instance by providing that the first wall 54a is composed of two plates resting on one another.

In the exemplary embodiment shown in FIG. 6, the shape of the outflow chamber 30, in cooperation with the elastically resilient wall 32, the counterpart chamber 36, the throttle 39, and the barometric cell 54, forms the highly effective pulsation-smoothing device 40. The components of the pulsation-smoothing device 40 are preferably disposed in the immediate vicinity of the outlet valve 24.

Figure 7:
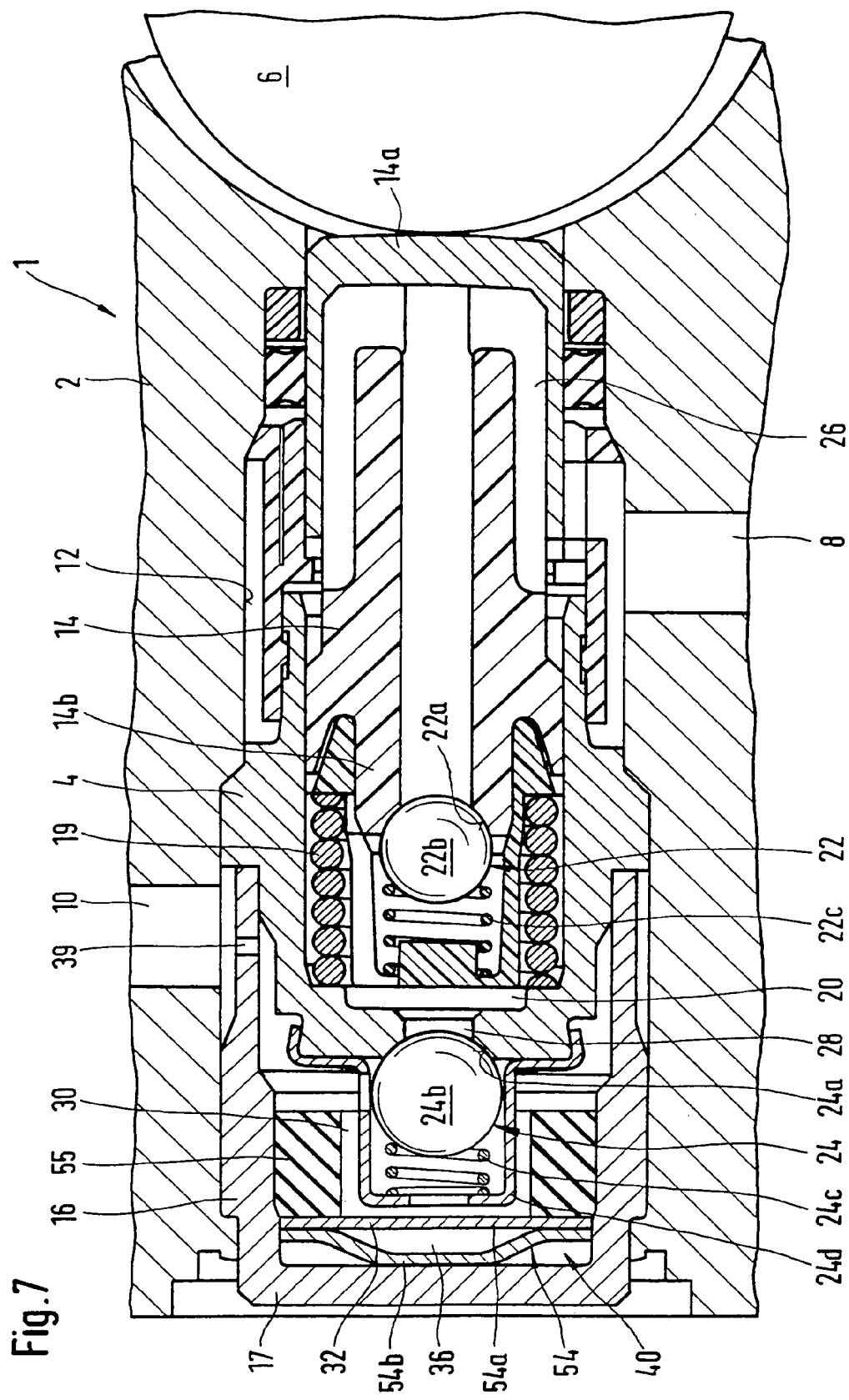

FIG. 7 shows a further especially advantageous exemplary embodiment.

FIG. 7 differs from FIG. 6 in having a compressible body 55 that damps vibration.

It has been demonstrated that by incorporating the compressible body 55 into the outflow chamber 30, pressure pulsations can be smoothed even better. The compressible body 55 is especially effective if, on the downstream side, it is located as close as possible to the outlet valve 24, in its immediate vicinity. By inserting the compressible body 55 shown in FIG. 7 into the outflow chamber 30, an additional compressibility in the outflow chamber 30 is obtained. As a result, despite the insertion of the compressible body 55 into the outflow chamber 30, the structural size overall can be kept substantially smaller than without the compressible body 55, and substantially better smoothing of the pressure pulsations is obtained.

In the exemplary embodiment shown in FIG. 7, the shape of the outflow chamber 30, in cooperation with the elastically resilient wall 32, the counterpart chamber 36, the throttle 39, the barometric cell 54, and the compressible body 55, forms the highly effective pulsation-smoothing device 40. The components of the pulsation-smoothing device 40 are preferably disposed downstream of and in the immediate vicinity of the outlet valve 24.

Figure 8:
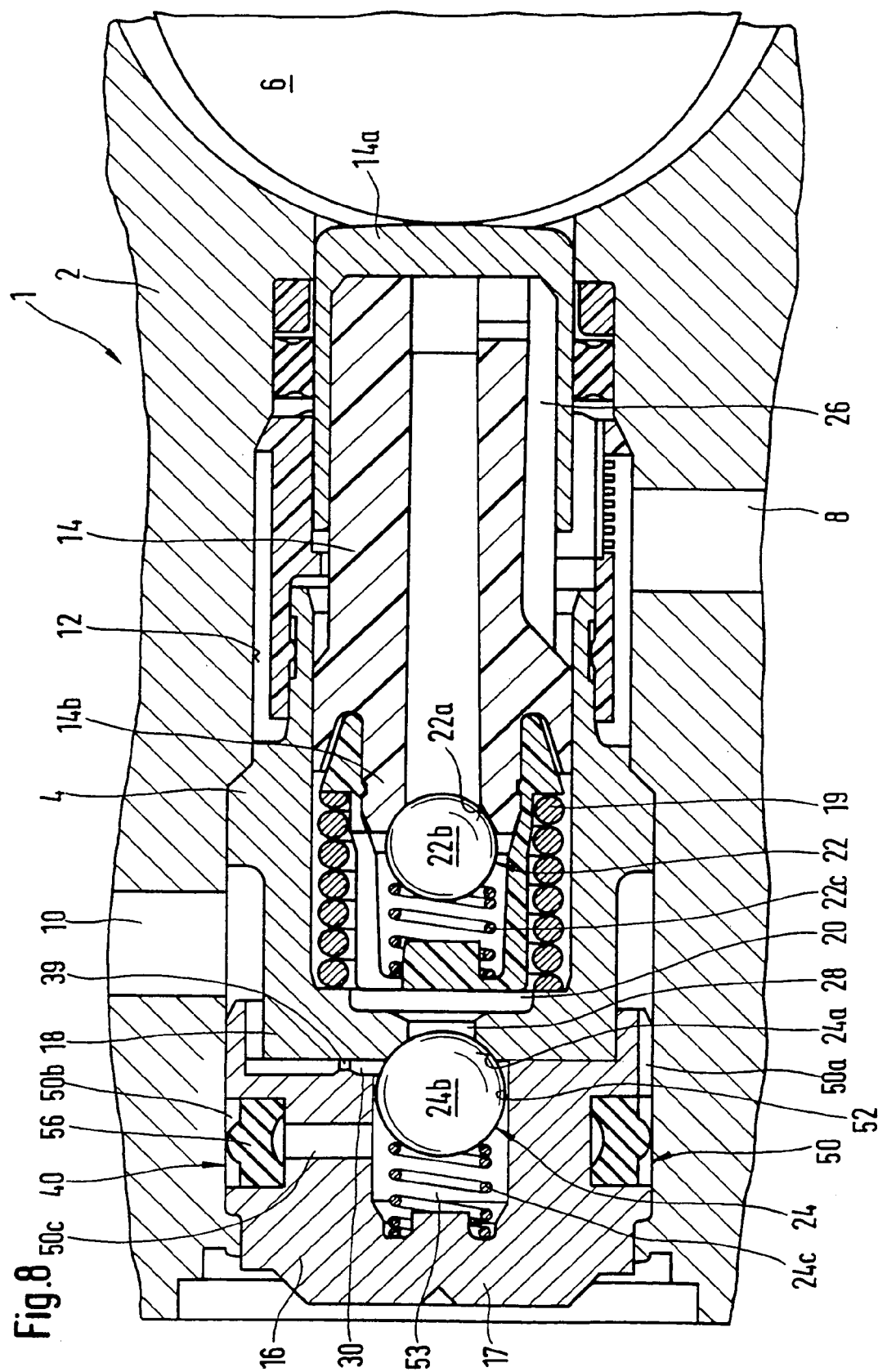

FIG. 8 shows a further especially advantageous exemplary embodiment.

The exemplary embodiment shown in FIG. 8 corresponds extensively to the exemplary embodiments shown in the other drawings, except for the differences named below. In particular, however, the piston pump shown in FIG. 8 is largely equivalent to the piston pump shown in FIG. 5.

In the exemplary embodiment shown in FIG. 8, a resilient wall 56 is sealingly inserted into the circumferential groove 50b of the passage 50. Because of the elastic deformation of the resilient wall 56, resulting from pressure pulsations in the rear valve chamber 53 caused by vibration of the closing body 24b, damping of the pressure fluctuations arising in the rear valve chamber 53 is obtained. The result is a calming of the vibration of the closing body 24b. As a result, the flow of pressure medium flowing through the outlet valve 24 and the outflow chamber 30 into the outflow conduit 10 is also calmed, so that overall, substantially weaker pressure fluctuations arise.

In the exemplary embodiment shown in FIG. 8, the shape of the outflow chamber 30, in cooperation with the throttle 39, the passage 50, the rear valve chamber 53, and the dampingly resilient wall 56, forms the highly effective pulsation-smoothing device 40. The components of the pulsation-smoothing device 40 are preferably disposed downstream of and in the immediate vicinity of the outlet valve 24.

Figure 9:
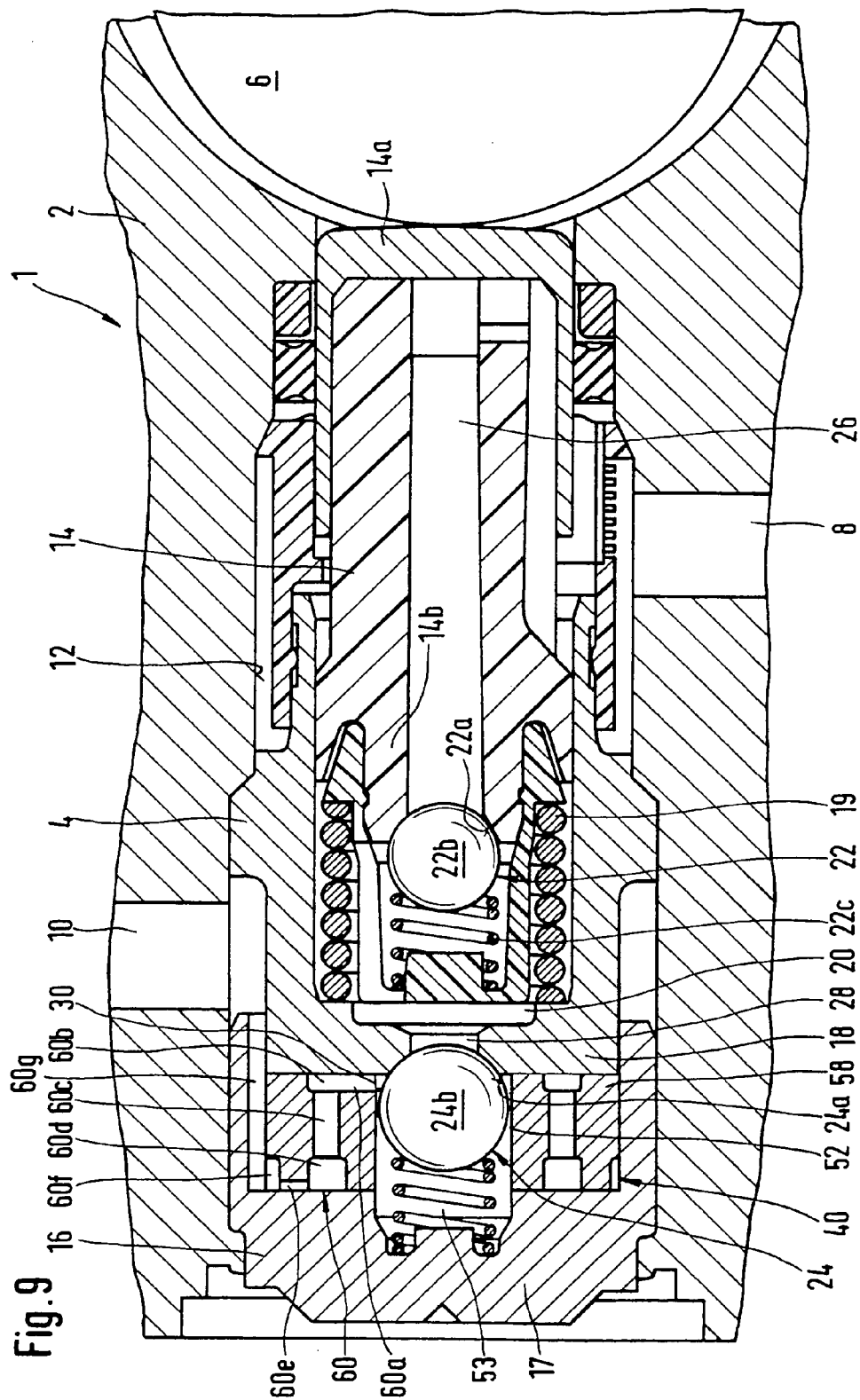

FIG. 9 shows a further especially advantageous exemplary embodiment.

The piston pump 1 shown as an example in FIG. 9 is essentially equivalent, except for the differences listed, to the piston pumps 1 shown as examples in the other drawings.

In the exemplary embodiment shown in FIG. 9, an insert 58 is incorporated into the installation chamber 12, between the closure piece bottom 17 and the bush bottom 18.

Between the outflow chamber 30 and the outflow conduit 10, a turbulence-causing throttle 60 is provided. The pressure medium flowing from the outlet valve 24 through the outflow chamber 30 to the outflow conduit 10 must pass through the turbulence-causing throttle 60. Beginning at the outflow chamber 30, the turbulence-causing throttle 60 for instance comprises one or more radial grooves 60a provided at the insert 58, a circumferential groove 60b made on the insert 58, one or more oblong slots 60c made in the insert 58, a second circumferential groove 60d, one or more radial conduits 60e, a third circumferential groove 60f, and one or more longitudinal conduits 60g. The at least one radial groove 60a and the circumferential groove 60b are located on the face end of the insert 58 toward the bush bottom 18. The second circumferential groove 60d, the at least one radial conduit 60e, and the third circumferential groove 60f are located in the face end of the insert 58 toward the closure piece bottom 17. The at least one longitudinal conduit 60g is preferably machined into an inner circumferential face of the closure piece 16. The at least one radial groove 60a connects the outflow chamber 30 with the circumferential groove 60b. The at least one oblong slot 60c connects the two circumferential grooves 60b, 60d to one another. The at least one radial conduit 60e connects the two circumferential grooves 60d, 60f to one another. The at least one longitudinal conduit 60g connects the third circumferential groove 60f with the outflow conduit 10.

Because the flow of pressure medium through the turbulence-causing throttle 60 is deflected many times, and because the turbulence-causing throttle 60 has quite different cross sections in the course of the flow path, and as a result the flow of pressure medium must flow at quite different flow speeds and in quite different directions and with sudden deflections, the overall result is a marked reduction in pulsations within the flow of pressure medium flowing from the outlet valve 24 into the outflow conduit 10; that is, it is assured that virtually no pressure pulsations can occur.

The essential parts of the turbulence-causing throttle 60 are located on or in the insert 58 that is easy to produce. This has the advantage that despite the turbulence-causing throttle 60, no complicated machining operations on the other parts of the piston pump 1 are necessary.

The rear valve chamber 53 communicates with the outflow chamber 30 only via the disconnection point 52 that allows only very little or practically no pressure medium to pass through it. Upon vibration of the closing body 24b, pressure fluctuations that are oriented directly counter to a vibration of the closing body 24b are engendered in the rear valve chamber 53. The result is a pronounced calming of the vibration of the closing body 24b. This result is a substantially more uniform hydraulic flow out of the outflow chamber 30 into the outflow conduit 10.

In the exemplary embodiment shown in FIG. 9, the shape of the outflow chamber 30 in cooperation with the rear valve chamber 53, the disconnection point 52 and the turbulence-causing throttle 60 form the highly effective pulsation-smoothing device 40. The components of the pulsation-smoothing device 40 are preferably disposed downstream of and in the immediate vicinity of the outlet valve 24.

Figure 10:
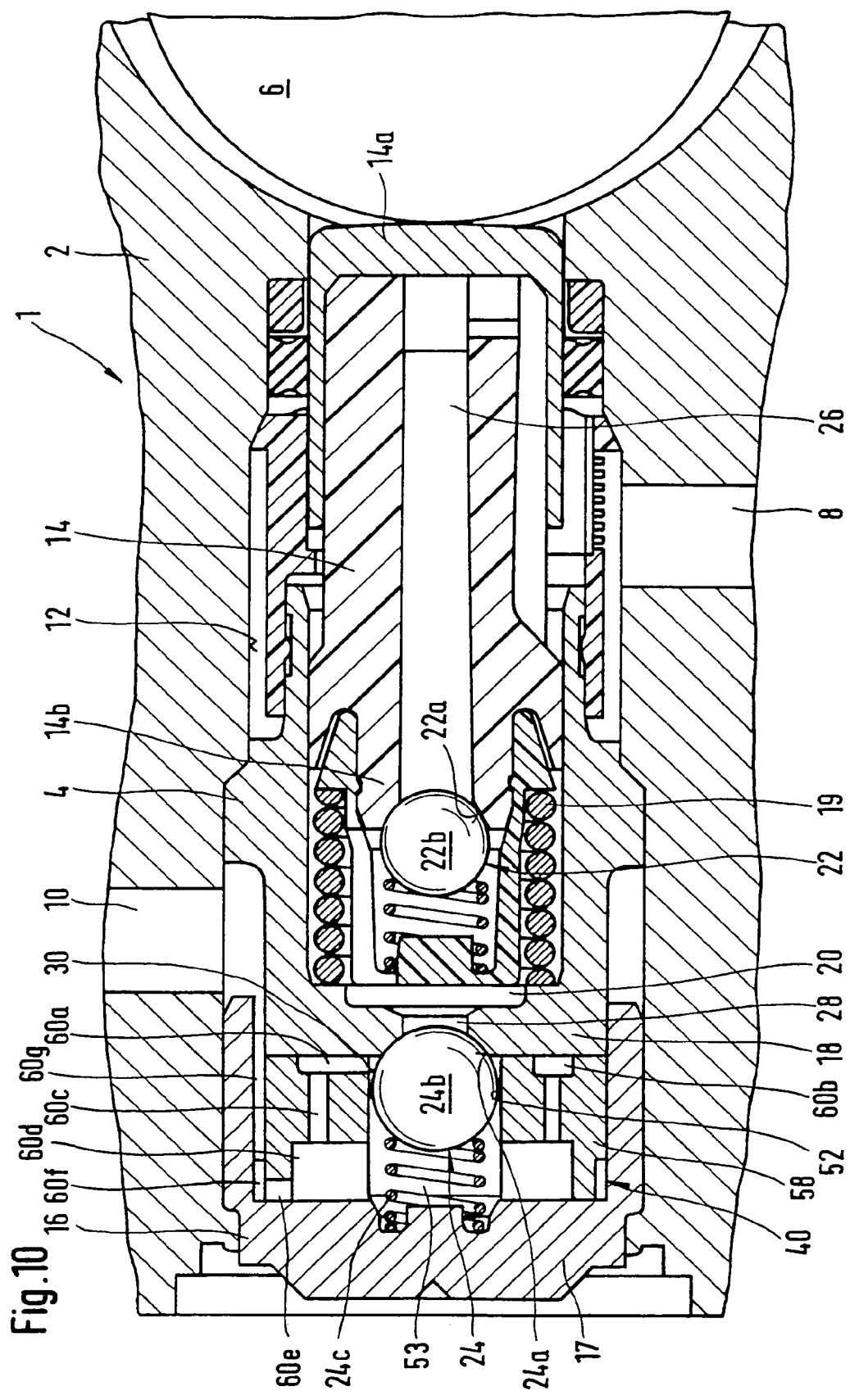

FIG. 10 shows a further especially advantageous exemplary embodiment.

Except for the differences shown or described below, the piston pump 1 shown in FIG. 10 is essentially equivalent to the piston pumps 1 shown in the other drawings. In particular, the piston pump 1 shown in FIG. 10 is largely equivalent to the piston pump 1 shown in FIG. 9.

In the exemplary embodiment shown in FIG. 10, the circumferential groove 60d of the turbulence-causing throttle 60 is widened radially inward so far that the circumferential groove 60d changes over into the rear valve chamber 53. As a result, the pressure medium flowing through the turbulence-causing throttle 60 is calmed, and the partially calmed pressure medium acts on the closing body 24b in the rear valve chamber 53, on the side of the closing body 24b remote from the passage 28. Because the flow of pressure medium is partly calmed by the turbulence-causing throttle 60, substantial damping of the vibration of the closing body 24b results. In the further flow of pressure medium out of the circumferential groove 60d in the direction of the outflow conduit 10, a further calming of the flow of pressure fluid and a further breakdown of pressure peaks then occur.

In the exemplary embodiment shown in FIG. 10, the shape of the outflow chamber 30, along with the rear valve chamber 53, the disconnection point 52, the turbulence-causing throttle 60, and the hydraulic communication of the rear valve chamber 53 with the turbulence-causing throttle 60, form the highly effective pulsation-smoothing device 40. The components of the pulsation-smoothing device 40 are preferably disposed downstream of and in the immediate vicinity of the outlet valve 24.

The foregoing relates to preferred exemplary embodiments of the invention, it being understood that other variants and embodiments thereof are possible within the spirit and scope of the invention, the latter being defined by the appended claims.

The invention claimed is:

1. A piston pump, comprising a pump housing (2),
   a bushing (4) disposed in the pump housing (2),
   a pump piston (14) supported displaceably in the bushing (4) and having two ends, one end facing towards an eccentric element and one end remote from the eccentric element, each of which are embodied on separate components fixed to one another,
   a restoring spring (19) braced on the bushing (4) and on the end (14b) of the pump piston (14) remote from the eccentric element,
   an inlet valve (22),
   an outlet valve (24),
   a compression chamber (20) provided between the inlet valve (22) and the outlet valve (24), which compression chamber (20) increases in size upon an intake stroke of the pump piston (14) and decreases in size upon a compression stroke of the pump piston (14), and
   a pulsation-smoothing device disposed in the vicinity of the outlet valve (24), which pulsation-smoothing device includes an outflow chamber (30) associated with the outlet valve (24), a throttle (39) downstream of the outflow chamber (30),
   a resilient wall (32) at least partially defining the outflow chamber (30), and a counterpart chamber (36) which is disposed on the side of the resilient wall (32) remote from the outflow chamber (30),
   wherein the pulsation-smoothing device (40) is disposed spatially in the immediate vicinity of the outlet valve (24), and
   further comprising an outflow conduit (10) of the piston pump (1) which communicates downstream of the throttle (39), via a connection (51), with the counterpart chamber (36) adjoining the resilient wall (32).

2. The piston pump of claim 1, further comprising a compressible body (34, 48, 55) in the outflow chamber (30).

3. The piston pump of claim 2, further comprising a friction device (49) on the resilient wall (32).

4. The piston pump of claim 1, further comprising a damping body (34, 48, 55) in the outflow chamber (30).

5. The piston pump of claim 1, further comprising a connecting throttle (51a) disposed between the outflow conduit (10) and the counterpart chamber (36).

6. The piston pump of claim 1, further comprising a friction device (49) on the resilient wall (32).

* * * * *